United States Patent

Soma et al.

[11] Patent Number: 5,925,824
[45] Date of Patent: Jul. 20, 1999

[54] CAPACITIVE DIFFERENTIAL PRESSURE DETECTOR

[75] Inventors: Shinichi Soma; Kimihiro Nakamura; Tadanori Yuhara, all of Kanagawa, Japan

[73] Assignee: Fuji Electric Co., Ltd., Kanagawa, Japan

[21] Appl. No.: 08/884,355

[22] Filed: Jun. 27, 1997

[30] Foreign Application Priority Data

Jul. 1, 1996 [JP] Japan ............................. 8-170941

[51] Int. Cl.$^6$ ....................................................... G01L 9/12
[52] U.S. Cl. ............................................................. 73/718
[58] Field of Search .................... 73/718, 724; 361/283.3

[56] References Cited

U.S. PATENT DOCUMENTS 4,390,925  6/1983  Freund ........................................ 73/718
5,056,369  10/1991  Tamai et al. .............................. 73/718

FOREIGN PATENT DOCUMENTS 0 114 177   8/1984   European Pat. Off. .
WO 88/00335 1/1988   WIPO .

Primary Examiner—William L. Oen
Attorney, Agent, or Firm—Pearne, Gordon, McCoy & Granger LLP

[57] ABSTRACT

In a capacitive differential pressure detector, an insulating plate (1) of a fixed electrode is covered with a gold conductive film. A conductive film (2) integrally includes an entire inner area (2a) of a center hole (1a), a square ring-shaped area (2b) surrounding the center hole (1a) on the side opposite to the conductive plate (12) and a band-shaped area (2c) extending therefrom in a centrifugal direction to reach the outer periphery. The conductive film (2) is electrically communicated with the conductive plate at the terminating position of the entire inner area (2a) and also with aluminum films at the terminating position of the band-shaped area (2c). Therefore, the total area of the ring-shaped area (2b) and the band-shaped area (2c) can be decreased so that Cs1+Cs2 is decreased to improve the static pressure span characteristic.

8 Claims, 5 Drawing Sheets

CAPACITIVE DIFFERENTIAL PRESSURE DETECTOR

BACKGROUND OF THE INVENTION

The present invention relates to a capacitive differential pressure detector in which fixed electrodes having the same shape and size are arranged oppositely to each other on both sides of a diaphragm displaced in accordance with a differential pressure to measure the differential pressure on the basis of the capacitance between the diaphragm and each fixed electrode, and more particularly to a capacitive differential pressure detector which can improve the static pressure span characteristic.

Now referring to FIGS. 5 and 6, an explanation will be given of an example. FIG. 5 is a sectional view of a differential pressure detector, and FIG. 6 is a sectional view of a differential pressure detecting apparatus equipped with the detector. In FIG. 5, the detector 50 has fixed electrodes 15 each having the same shape and size arranged on both left and right sides of a diaphragm 10. The fixed electrode 15 is a three-layer structure including a disk-shaped conductor plate 12 facing the diaphragm 10, a central insulating plate 13 having a square shape and a conductive plate 14 having the same square shape, these plates being stacked and bonded in order. A central hole 25 for introducing pressure is penetrated through this three-layer structure. The inner face is covered with a conductive film 27. The conductive plates 12 and 14 are communicated with each other through the conductive film 27. These two fixed electrodes 15 are bonded to the diaphragm 10 in such a form that the conductive plates are opposite to each other with respect to the diaphragm 10 through gaps 29, and also insulatively bonded to the diaphragm 10 by glass bonding portions 11 through ring-shaped supporting bodies 21 which may be either conducting or insulating material. The ring-shaped supporting bodies 21 are diametrically apart from the outer periphery of the conductive plates 12 by ring-shaped grooves 23 and are located at the peripheral portions on both sides of the diaphragm 10. In this example, the diaphragm 10, conductive plates 12, 14 and supporting body 21 are made of Si, and the insulating plate 13 is made of ceramics. Pressures P1 and P2 are introduced through the pressure-introducing center holes 25 of the left and right fixed electrodes 15, and the diaphragm 10 is displaced in accordance with the differential pressure (=P1−P2) (i.e. its central portion warps). The total capacitances C1 and C2 of the capacitors formed by the diaphragm 10 and left/right fixed electrodes 15 are taken out through lead pins C, A and lead pins C, B, respectively. Incidentally, numerals 31, 32 and 33 are vapor-deposited aluminum films (terminals for taking out capacitance).

Where the total capacitances C1 and C2 vary differentially in response to the differential pressure (=P1−P2), the output F in proportion to the differential pressure can be obtained by a known electronic circuit, where F=(C1−C2)/(C1+C2).

As seen from FIG. 6, the detector 50 is installed into a vessel mainly made up of a bottomed cylinder 51 equipped with a sealing diaphragm 59, an attaching plate 55 and a cap equipped with a sealing diaphragm 58 to constitute a differential pressure detecting apparatus. The cylinder 51 is provided at its right end face with a sealing diaphragm 59 to define a pressure chamber 62 therebetween, and the pressure chamber 62 is communicated with an internal chamber 52 inside the cylinder 51 through a center hole 60. The detector 50 is housed in the internal chamber 50. Lead pins A, B and C of the detector 50 are insulated by hermetic sealing terminals 63 and lead out to penetrate the peripheral wall of the cylinder 51. On the left side of the detector 50 (on the left side surface of the conductive plate 14, see FIG. 5), a metallic pipe 54 is provided through an insulating body (square plate member). The metallic pipe 54 is welded to an attaching plate 54 at its left end outer periphery. The attaching plate 55 is inserted into a spot facing hole on the left side of the cylinder 51 and welded thereto so that its opening is closed. The cap 56 includes a center hole 57 communicating with a pressure receiving chamber 62 which is an space inside the above sealing diaphragm 58 at the left end face. The entire internal spaces such as the pressure receiving chambers 61, 62 and internal chamber 52, which are placed between the sealing diaphragms 58 and 59, are filled with silicone oil which is non-compressive fluid. The pressure P1 acting on the sealing diaphragm is transmitted to the left side of the diaphragm of the detector 50 through the filled silicon oil whereas the pressure P2 acting on the sealing diaphragm 59 is transmitted to the diaphragm 10 (see FIG. 5).

The conventional example has a disadvantage that the static span characteristic is poor. Generally, the output characteristic of the detector when the differential pressure varies in a range of 0–100% can be substantially represented as a linear line passing an origin in case where the static pressure is used as a parameter. The output characteristic at a certain static pressure forms an slanting angle swinging or deflecting slightly upward or downward relative to the reference output characteristic established when the static pressure is zero. The degree of the swing (or deflection) is referred to as "static pressure span characteristic". The static pressure span characteristic, which can be regarded as the span error due to the static pressure, is caused by the fact that the floating capacitance formed within the detector or between the detector and a vessel incorporating the detector therein and the relative permittivity of silicon oil are varied due to static pressure. Assuming that this static pressure span characteristic is $\epsilon$, it can be expressed by Equation (1).

Now, in FIG. 5, areas A and B are equivalently shown, that is, Co represents the capacitance between the diaphragm 10 and the left/right conductive plate 12 when the static pressure is zero, and Cs1 represents the capacitance between the diaphragm 12 and the supporting body 21. In FIG. 6, area C is equivalently shown, that is, Cs2 represents the common capacitance between the conductive plate 14 of the right fixed electrode and the bottom of the cylinder 51 or between the conductive plate 14 of the left fixed electrode and the right side of the attaching plate. The above-noted characters are used in the Equation (1). In addition, β represents variation value of the relative permittivity of the silicone oil at the static pressure P in case where the static pressure of zero is considered as a reference value. Note that the unit for the pressure P is 100 bar and the unit for the capacitance is pF.

[Equation 1]

$$\epsilon = -[(Cs1+Cs\beta/Co\ (1+\beta P/100)]P \qquad (1)$$

Now assuming that P=100 bar, β=0.013, Co=50 pF, Cs1=2 pF, Cs2=1.7 pF, $$\epsilon = -[(2+1.7)1.3 \times 10^{-2}/50(1+1.3\cdot 1\cdot 10^{-4})]\cdot 1 = -0.096\ (\%)$$

As understood from Equation (1), in order to improve or decrease the static pressure span characteristic $\epsilon$, the following measures (1) to (3) can be adopted.

(1) To decrease Cs1+Cs2
(2) To adopt a filling liquid having a smaller β
(3) To increase Co However, in order to decrease Cs1 in the measure (1), the diameter of the conductive plate 12 must be reduced. This decreases Co. Hence the measure (1) contradicts the measure (3) and also is not preferable from the viewpoint of S/N ratio. The measure (2) of adopting the filling liquid other than silicone oil is not practical from the standpoint of availability or cost. The measure (3) can be achieved by increasing the area of the conductive plate 12 or decreasing the clearance or gap between the diaphragm 10 and the conductive plate 12. However, this is not actually carried out because of the dimensional restriction of the detector. The remaining measure is to decrease Cs2 in the measure (1).

SUMMARY OF THE INVENTION

An object of the present invention is to solve the above-mentioned problem encountered in the conventional example, and to thereby provide a capacitive differential pressure detector improved in the static pressure span characteristic.

A preferred embodiment of the invention, in a capacitive differential pressure detector in which fixed electrodes having the same shape and size are arranged oppositely to each other on both sides of a diaphragm displaced in accordance with differential pressure to measure the differential pressure on the basis of the capacitance between the diaphragm and each fixed electrode, is characterized by a structure wherein each fixed electrode includes an insulating plate having a center hole for introducing pressure; a conductive plate provided at the center area of the surface on the side of diaphragm of the insulating plate and having the central hole for introducing pressure; a ring-shaped supporting body provided at the edge of the surface on the side of the diaphragm of the insulating plate so as surround the conductive plate apart therefrom; a conductive film deposited integrally on the surface of the insulating plate so as to cover an entire inner area of the center hole, a ring-shaped area surrounding the center hole on the surface opposite to the conductive plate and a band-shaped area extending from the ring-shaped area in a centrifugal direction to reach the outer periphery of the insulating plate, and communicated with the conductive plate at the terminating position of the entire inner area of the insulating plate and with a terminal for extracting capacitance at the terminating position of the band-shaped area, said fixed electrode being insulatively bonded to the edge surface of the diaphragm, with the conductive plates being opposite in proximity to each other at the center area of the diaphragm, through the ring-shaped supporting body.

A preferred embodiment of the invention, in a capacitive differential pressure detector in which fixed electrodes having the same shape and size are arranged oppositely to each other on both sides of a diaphragm which is displaced in accordance with a differential pressure to measure the differential pressure on the basis of the capacitance between the diaphragm and each fixed electrode, is characterized by a structure that said diaphragm has circular flat recess portions formed at the center except the edge portions of the surfaces thereof, and each of said fixed electrodes includes: an insulating plate having a central hole for introducing pressure; a conductive plate provided at the center area of the surface on the side of diaphragm of the insulating plate and having the central hole for introducing pressure; a ring-shaped supporting body provided at the edge of the surface on the side of the diaphragm of the insulating plate so as surround the conductive plate apart therefrom; a conductive film deposited integrally on the surface of the insulating plate so as to cover a center area on the side of the diaphragm, an entire inner area of the center hole, a ring-shaped area surrounding the center hole on the surface opposite to the conductive plate and a band-shaped area extending from the ring-shaped area in a centrifugal direction to reach the outer periphery of the insulating plate, and communicated with the conductive plate at the terminating position of the entire inner area of the insulating plate and with a terminal for extracting capacitance at the terminating position of the band-shaped area, said fixed electrode being insulatively bonded to the edge surface of the diaphragm, with the conductive area on the side of the diaphragm being in opposite in proximity to the flat recess bottom of the diaphragm.

In the invention, preferably, (1) the insulating plate is chamfered at the position corresponding to the band-shaped area at the outer peripheral ridge of the surface opposite to the diaphragm; (2) said diaphragm and conductive plate are made of single-crystal silicon, respectively, and said insulating plate is made of a material, e.g. cordierite or borosilicate glass, having a thermal expansion coefficient approximate to that of the single-crystal silicon; (3) the conductive film is made by sputtering, and the center hole for introducing pressure of said insulating plate is a conical trapezoidal hole communicated with the center hole of the conductive plate at its surface on the side thereof and spreading toward the surface opposite to the conductive plate, or otherwise the center hole for introducing pressure of said insulating plate includes two coaxial conical trapezoidal holes tapered inward from the surfaces on both sides of the insulating plate so as to be communicated with each other.

In the former embodiment, the conductive film (film area covering the ring-shaped area and band-shaped area extending therefrom to reach the outer periphery) deposited on the surface opposite to the diaphragm of the fixed electrode can be decreased. Thus, the term Cs1+Cs2 of the measure (1) described herein is decreased so that the static pressure span characteristic can be improved. In the case of latter embodiment, Cs1 does not exist and Cs2 is also small as described above. Therefore, the value of Cs1+Cs2 in the measure (1) is further decreased so that the static pressure span characteristic can be improved.

In the inventions, in the structure of (1), since the band-shaped area of the conductive film is chamfered in a slanted shape at the outer ridge of the surface opposite to the diaphragm of the insulating plate, conduction between the evaporated aluminum film (with which each of the lead pins A, B and C are in contact) for extracting capacitance and the band-shaped conductive film area can be assured. In the structure of (2), the fixed electrode is suppressed from being thermally deformed because of the change in the environmental temperature, thus suppressing generation of thermal stress so that linearity of the differential pressure is maintained to improve the temperature characteristic. In the structure of the measure (3), the conductive film can be easily made by sputtering, thus assuring the uniformity of thickness to improve the quality of the conductive film.

DETAILED DESCRIPTION OF THE PREFERRED EMBODIMENTS

Figure 3:
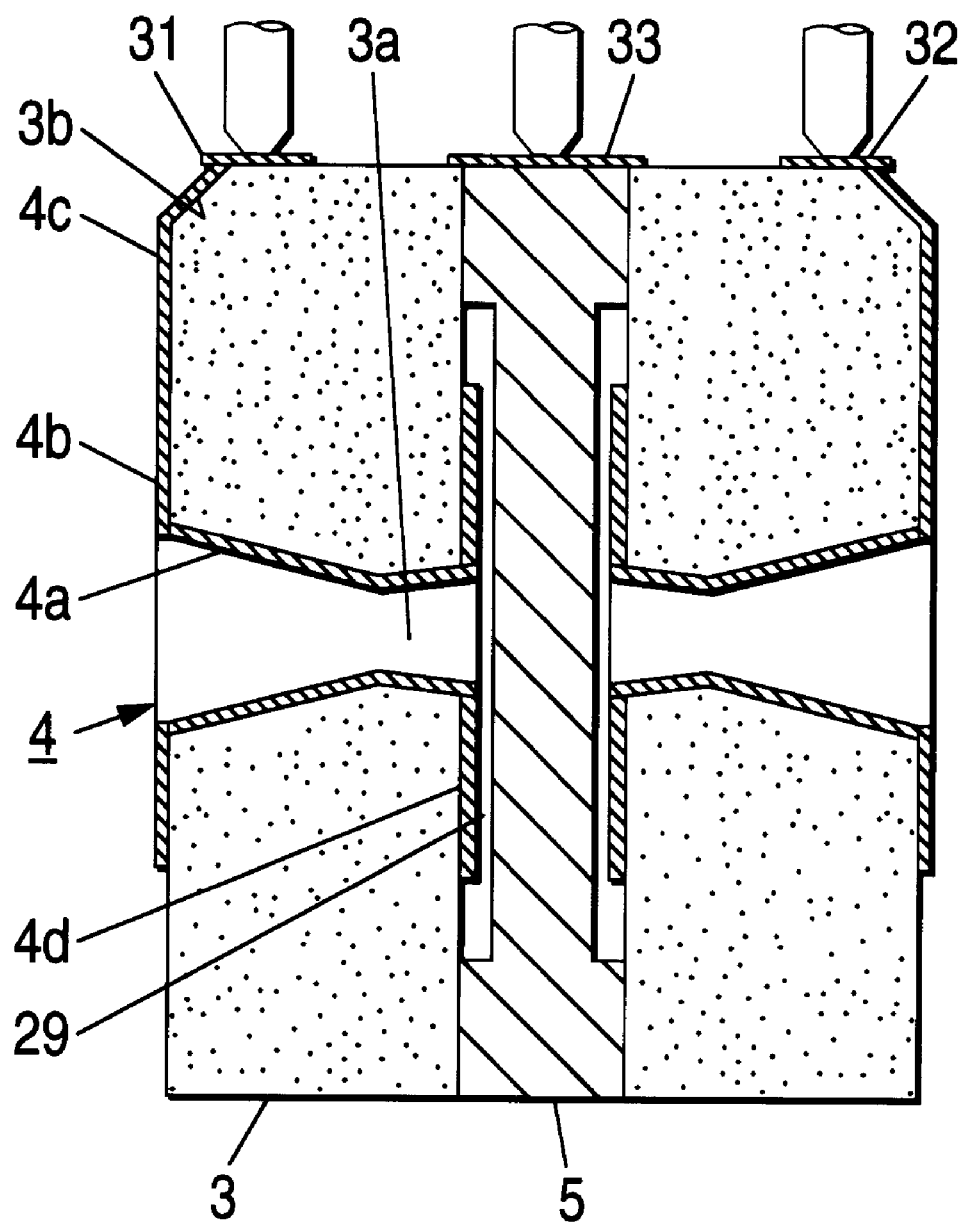
FIG. 3 is a sectional view of a second embodiment of the present invention.
Figure 4:
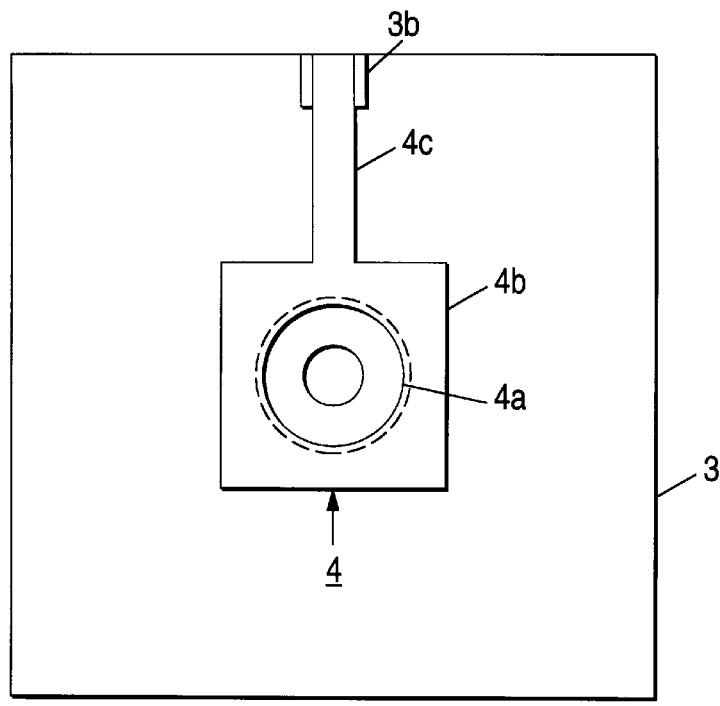
FIG. 4(a) is a side view of the fixed electrode in the second embodiment viewed from the side opposite to the diaphragm and FIG. 4(b) is a side view thereof viewed from the diaphragm.
Figure 4:
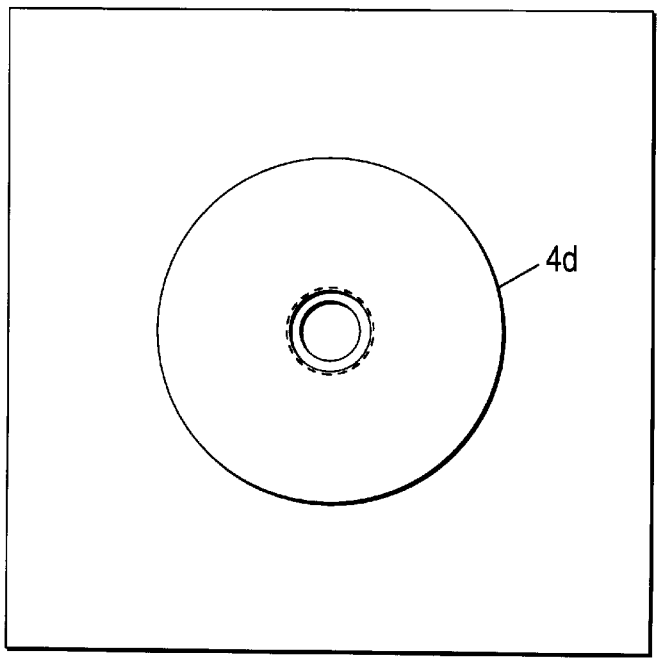

Now referring to the drawings, an explanation will be given of the first and second embodiments of the present invention. The first embodiment is shown in FIGS. 1 and 2, and the second embodiment is shown in FIGS. 3 and 4.

Figure 1:
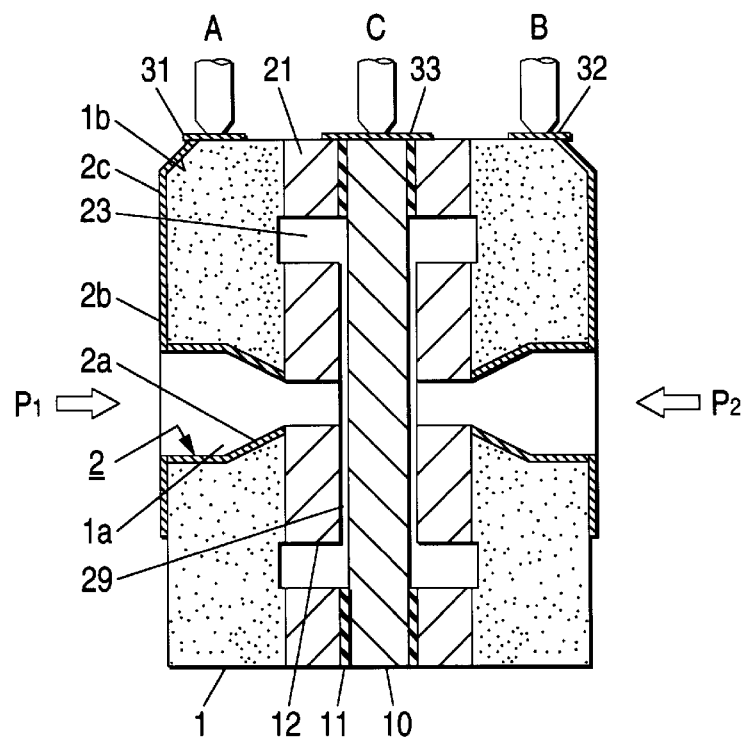
FIG. 1 is a sectional view of a first embodiment of the present invention.

FIG. 1 is a sectional view of the first embodiment. FIG. 2 is a side view thereof. In the first embodiment, as seen from FIG. 1, fixed electrodes having the same shape and size are arranged oppositely to each other through gaps 29 on both sides of the diaphragm 10 which is displaced in accordance with differential pressure. Each of the fixed electrode includes an insulating plate 1 having a central hole for introducing pressure, a conductive plate 12, a ring-shaped supporting body 21 and a conductive film 2 made of gold. The center hole 1a of the insulating plate 1 is a conical trapezoidal hole which is tapered internally from the outside surface and communicates with the center hole of the conductive plate. The ring-shaped supporting body 21 is provided at the peripheral portion of the surface of the insulating plate 1 on the side of the diaphragm 10 so as to surround the conductive plate 12 apart therefrom. The conductive film 2 is constructed integrally by a portion (entire inner area portion) 2a covering the entire inner surface of the center hole 1a, a portion (ring-shaped area portion) 2b covering a ring-shaped area having a square contour and having a central, circular hollow portion so as to surround the center hole 1a on the surface of the insulating plate 1 opposite from the conductive plate 12 and a portion (band-shaped area portion) 2c covering the band-shaped area extending from the ring-shaped area in a centrifugal direction up to the outer periphery (see FIG. 2). Incidentally, the regular square of the ring-shaped area portion 2b corresponds to the insulator 53 (see FIG. 6) used for incorporation into the vessel. The gold conductive film 2, which is formed by sputtering, is electrically communicated with the conductive plate 12 at the terminating position of the entire inner area portion 2a and with aluminum films 31, 32, which are terminals for extracting capacitance, at the terminating position of the band-shaped area 2c.

Figure 2:
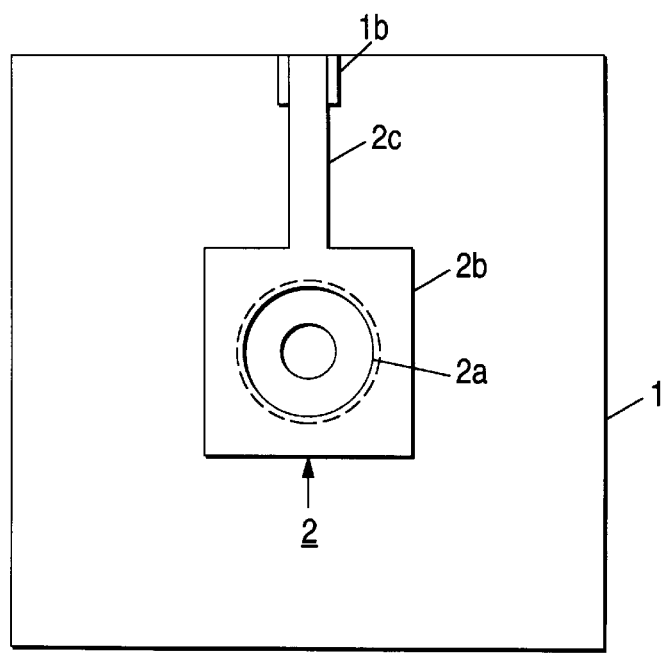
FIG. 2 is a side view of the first embodiment of the present invention.

As seen from FIGS. 1 and 2, the insulating plate 1 has a sloped chamfer 1b formed at the position corresponding to the band-shaped area 2c at the outer peripheral ridge of the surface of the insulting plate 1 opposite from the diaphragm 10. The diaphragm 10 and conductive plate 12 are made of single-crystal silicon, respectively. The insulating plate 1 is made of a material having a thermal expansion coefficient approximate to that of the single-crystal silicon, e.g. cordierite. More precisely, the cordierite is ceramics in which cordierite and mullite are mixed at a certain ratio. The (linear) thermal expansion coefficient of single crystal silicon is $3.1 \times 10^{-6}/°C$. and that of cordierite is $1.1 \times 10^{-6}/°C$.

Figure 5:
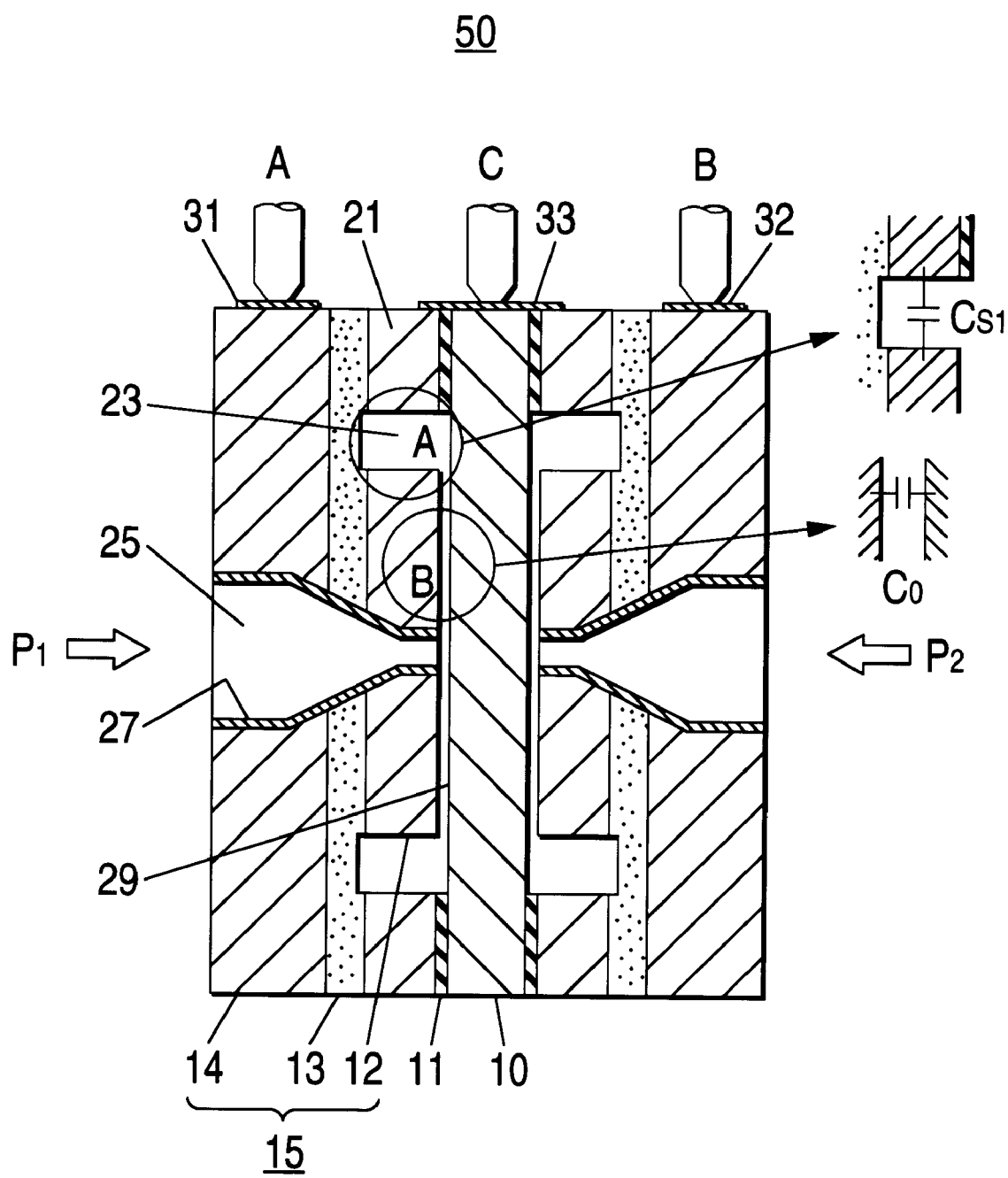
FIG. 5 is a sectional view of the conventional example.
Figure 6:
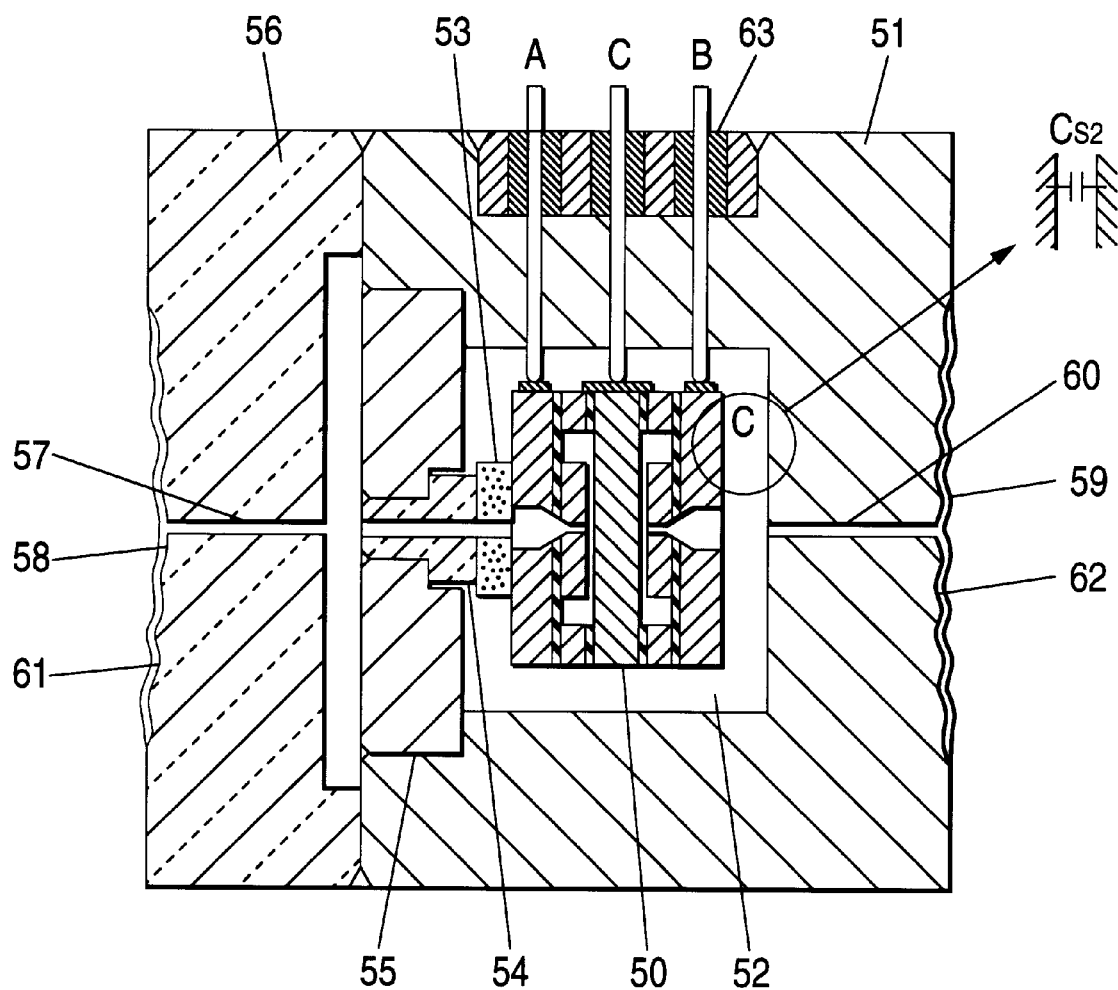
FIG. 6 is a sectional view of the differential pressure detector apparatus into which the conventional example is incorporated.

The total area of the ring-shaped area portion 2b and band-shaped area portion 2c of the conductive film 2 deposited on the surface of the fixed electrode opposite from the diaphragm 10 can be made smaller than the area of the conductive plate 14 of the conventional example shown in FIG. 5. Therefore, the value corresponding to Cs2 in FIG. 6 is decreased, and the value of Cs1+Cs2 in the measure (1) is also decreased. Thus, the static pressure span characteristic can be improved.

If the total area of the ring-shaped area portion 2b and the band-shaped area portion 2c is half as large as the area of the conductive plate 14 in the conventional example shown in FIG. 5 and the other condition is the same, since Cs2=1.7/2=0.85 (pF), $$\epsilon = -[(2+0.85)1.3 \times 10^{-2}/50(1+1.3 \cdot 1 \cdot 10^{-4})] \cdot 1 = -0.074 \ (\%)$$

In accordance with the first embodiment, the conventional static span characteristic can be improved by about 23%.

Since the center hole 1a of the insulating plate 1 has a conical trapezoidal shape, the conductive film 2 can be easily made by sputtering, thus assuring the uniformity of thickness. Further, since the insulating plate 1 is provided with the chamfer 1b, the aluminum films 31, 32 are vapor-deposited to cover the upper ends of the band-shaped area portions 2c partially, thus assuring electric conduction therebetween. Further, since the insulating plate 1 is made of the material having a thermal expansion coefficient approximate to that of the single-crystal silicon, i.e., cordierite, the fixed electrode is suppressed from being thermally deformed because of the change in the environmental temperature, thus suppressing generation of thermal stress and improving the temperature characteristic.

FIG. 3 is a sectional view of the second embodiment. FIGS. 4(a) and 4(b) show the fixed electrode in the second embodiment. Specifically, FIG. 4(a) is a side view thereof viewed from the side opposite from a diaphragm 5 whereas FIG. 4(b) is a side view thereof viewed from the side of the diaphragm. In the second embodiment, as seen from FIG. 3, the fixed electrodes having the same shape and size are arranged oppositely to each other through gaps 29 on both sides of the diaphragm 5 which is displaced in accordance with differential pressure. The diaphragm 5 has circular flat recess portions formed at the center except the peripheral portions of the surfaces thereof. Each fixed electrode includes an insulating plate 3 having a central hole 3a for introducing pressure and a gold conductive film 4. The conductive film 4 is constructed integrally by a circular central area portion 4d (which corresponds to the conductive plate 12 in the first embodiment) on the surface of insulating plate 3 on the side of the diaphragm 5, an entire inner area portion 4a for the center hole 3a, a ring-shaped area portion 4b surrounding the center hole 3a on the surface of the insulating plate 3 opposite from the diaphragm 5 and a band-shaped area portion 4c extending from the ring-shaped area portion 4b in a centrifugal direction up to the outer periphery (see FIG. 4). As in the first embodiment, the regular square of the ring-shaped area 4b corresponds to the insulator 53 (see FIG. 6) used for incorporation into the vessel. The conductive films 4, which are formed by sputtering, are electrically communicated with aluminum films 31, 32, which are terminals for extracting capacitance, at the terminating position of the band-shaped area portions 4c. As seen from FIGS. 3 and 4(a), the insulating plate 1 has a sloped chamfer 3b formed at the position corresponding to the band-shaped area portion 2c at the outer peripheral ridge of the surface opposite from the diaphragm 5. The diaphragm 10 is made of single-crystal silicon and the insulating plate 3 is borosilicate glass having a thermal expansion coefficient approximate to that of single crystal silicon. It should be noted that the coupling between the diaphragm 5 and the insulating plate 3 is anodic-coupling.

Thus, Cs1 in the measure (1) does not exist, and the total area of the ring-shaped area portion 4b and band-shaped area portion 4c of the conductive film 4 deposited on the surface of the fixed electrode opposite from the diaphragm 5 can be made small as in the first embodiment. The value of Cs1+Cs2 in the measure (1) can be further decreased. Thus, the static pressure span characteristic can be further improved.

If Cs1 does not exist, the total area of the ring-shaped area 4b and the band-shaped area 4c is half as large as the area of the conductive plate 14 in the conventional example shown in FIG. 5 and the other condition is the same, since Cs1=0 and Cs2=1.7/2=0.85 (pF), $$\epsilon = -[(2+0.85)1.3 \times 10^{-2}/50(1\ 30\ 1.3 \cdot 1 \cdot 10^{-4})] \cdot 1 = -0.022\ (\%)$$

In accordance with the second embodiment, the conventional static pressure span characteristic can be improved by about 77%.

As similarly to the first embodiment, there are an advantage in provision of conductive film 2 by sputtering because the central hole 4a of the insulating plate 1 has a conical trapezoidal shape opened to both sides, an advantage in assurance of conduction of the aluminum films 31, 32 by the provision of the chamfer 1b on the insulating plate 3, and an advantage owing to the insulating plate 1 being made of borosilicate glass having a thermal expansion coefficient approximate to that of the diaphragm 5 made of single-crystal silicon.

In accordance with the present invention, the following meritorious effects can be obtained.

(1) In the case of first embodiment, the conductive film (film area portion covering the ring-shaped area and the band-shaped area extending from the ring-shaped area up to the outer periphery) deposited on the surface of the fixed electrode opposite from the diaphragm can be decreased. Thus, the value Cs1+Cs2 of the measure (1) described herein is decreased so that the static pressure span characteristic can be improved by about 23% in accordance with the first embodiment as compared with the prior art. In the case of second embodiment, Cs1 does not exist and Cs2 is also small as described above. Therefore, the value of Cs1+Cs2 in the measure (1) is further decreased so that the static pressure span characteristic can be improved in accordance with the second embodiment by about 77% as compared with the conventional example.

(2) Further, since the outer peripheral ridge portion of the surface of insulating plate, which is located opposite from the diaphragm and which corresponds the band-shaped area portion of the conductive film, is chamfered in a slanted shape, the conduction between the vapor-deposited aluminum film (with which each of the lead pins A, B and C are in contact) for extracting capacitance and the band-shaped conductive film area portion can be assured, thereby assisting precise extraction of capacitance and measurement of the differential pressure.

(3) Since the insulating plate 1 is made of the material having a thermal expansion coefficient approximate to that of the diaphragm or conductive plate, the fixed electrode is suppressed from being thermally deformed because of the change in the environmental temperature, thus suppressing generation of thermal stress and improving the temperature characteristic.

(4) Since the central hole la of the insulating plate 1 has a conical trapezoidal shape tapered inward, the conductive film can be easily formed by sputtering, thus assuring the uniformity of thickness to improve the quality of the conductive film.

What is claimed is:

1. A capacitive differential pressure detector for measuring differential pressure based on capacitance between a diaphragm and each of fixed electrodes having the same shape and size and being insulatively fixed through spacers on respective sides of said diaphragm displaced in response to differential pressure, wherein each of said fixed electrodes comprises:
    an insulating plate having a first pressure-introduction center hole and fixed to a corresponding one of said spacer so that said insulating plate is located opposite from said diaphragm with respect to said corresponding one of said spacer;
    a conductive plate fixed on said insulating plate, said conductive plate facing said diaphragm and being surrounded by said corresponding one of said spacer through a gap, said conductive plate having a second pressure-introduction central hole; and
    a conductive film integrally deposited on said insulating plate, said conductive film including:
        a first portion covering an entire inner circumference of said first pressure-introduction center hole and being electrically connected to said conductive plate at an end of said first press-introduction hole;
        a second portion surrounding the opposite end of said first pressure-introduction hole and being formed on a surface of said insulating plate opposite from said conductive plate; and
        a third portion extending from said second portion up to an outer periphery of said insulating plate at which said third portion is electrically connected to a terminal for extracting capacitance.

2. A capacitive differential pressure detector for measuring differential pressure based on capacitance between a diaphragm and each of fixed electrodes having the same shape and size and being arranged on respective sides of said diaphragm displaced in response to differential pressure,
    wherein said diaphragm is formed at each side with a recessed portion surrounded by an outer peripheral portion of said diaphragm; and
    wherein each of said fixed electrodes comprises:
        an insulating plate having a first pressure-introduction center hole and fixed to an end face of said outer peripheral portion of said diaphragm; and
        a conductive film integrally deposited on said insulating plate, said conductive film including:
            a first portion covering an entire inner circumference of said first pressure-introduction center hole;
            a second portion surrounding an end of said first pressure-introduction hole and being formed on a surface of said insulating plate opposite from said diaphragm;
            a third portion extending from said second portion up to an outer periphery of said insulating plate at which said third portion is electrically connected to a terminal for extracting capacitance; and
            a fourth portion facing said recessed portion of said diaphragm.

3. A capacitive differential pressure detector according to claim 1 or 2, wherein a portion of said outer periphery of said insulating plate, which corresponds to said third portion, is chamfered.

4. A capacitive differential pressure detector according to claim 1, wherein said diaphragm and conductive plate are made of single-crystal silicon, respectively, and said insulating plate is made of a material having a thermal expansion coefficient approximate to a thermal expansion coefficient of the single-crystal silicon.

5. A capacitive differential pressure detector according to claim 2, wherein said diaphragm is made of single-crystal silicon, and said insulating plate is made of a material having a thermal expansion coefficient approximate to a thermal expansion coefficient of the single-crystal silicon.

6. A capacitive differential pressure detector according to claim 1, wherein said conductive film is formed by sputtering, and wherein said first pressure-introduction center hole is adjoining said second pressure-introduction center hole and has a trunncated conical shape having a varying diameter decreasing toward said second pressure-introduction center hole.

7. A capacitive differential pressure detector according to claim 2, wherein said conductive film is formed by sputtering, and wherein said first pressure-introduction center hole includes two coaxial trunncated conical holes communicated with each other and each having a varying diameter decreasing toward the other.

8. A capacitive differential pressure detector according to claim 1, wherein each of said spacer has a ring-like shape.

* * * * *

UNITED STATES PATENT AND TRADEMARK OFFICE
CERTIFICATE OF CORRECTION

PATENT NO. : 5,925,824
DATED : July 20, 1999
INVENTOR(S) : Soma et al.

It is certified that error appears in the above-identified patent and that said Letters Patent is hereby corrected as shown below:

On the Title Page, Section [56], References Cited, U.S. PATENT DOCUMENTS, 1st Reference, delete "Freund" and insert --Freud--.

Column 2, Line 58, delete "$\epsilon=-[(Cs1+Cs6/Co\ (1+\delta P/100)]P$" and insert --$\epsilon=-[(Cs1+Cs2)\delta/Co\ (1+\delta P/100)]P$--.

Column 7, Line 14, delete
"$\epsilon=-[(2+0.85)1.3\times10^{-2}/50(1\ 30\ 1.3\cdot1\cdot10^{-4})]\cdot1=0.022(\%)$"
and insert
--$\epsilon=-[(2+0.85)1.3\times10^{-2}/50(1+1.3\cdot1\cdot10^{-4})]\cdot1=-0.022(\%)$--.

Signed and Sealed this

Thirtieth Day of November, 1999

Attest:

Attesting Officer

Q. TODD DICKINSON

Acting Commissioner of Patents and Trademarks